United States Patent [19]

Tani et al.

[11] 4,194,837
[45] Mar. 25, 1980

[54] ORIGINAL FEED APPARATUS FOR ELECTROPHOTOGRAPHIC COPYING MACHINE

[75] Inventors: Tatsuo Tani; Sakae Ota, both of Tokyo; Masao Kono, Kawasaki, all of Japan

[73] Assignee: Ricoh Company, Ltd., Japan

[21] Appl. No.: 964,876

[22] Filed: Nov. 30, 1978

[30] Foreign Application Priority Data

Dec. 2, 1977 [JP] Japan .......................... 52-161984[U]

[51] Int. Cl.² ......................... G03B 27/62; B65H 5/22
[52] U.S. Cl. .......................................... 355/75; 271/4
[58] Field of Search ................. 271/4, 233; 355/3 SH, 355/75, 14

[56] References Cited
U.S. PATENT DOCUMENTS

| | | | |
|---|---|---|---|
| 3,245,311 | 4/1966 | Cerasani et al. ...................... 355/75 |
| 3,874,651 | 4/1975 | Sisson ..................................... 271/4 |
| 3,944,367 | 3/1976 | Hakanson et al. ..................... 355/76 |
| 4,056,320 | 11/1977 | Mochimaru et al. ................. 355/75 |
| 4,146,220 | 3/1979 | Barton ................................. 271/233 |

*Primary Examiner*—Donald A. Griffin
*Attorney, Agent, or Firm*—McGlew and Tuttle

[57] ABSTRACT

A multi-mode copying machine capable of effecting copying in accordance with a sheet mode copying system and a book mode copying system is provided with an original feed apparatus having means for guiding conveyor belts to deflect away from an original irradiation position in their travel, the conveyor belts being adapted to transport an original in sheet form. Further, the original feed apparatus has means for transporting an original in sheet form exactly at a predetermined rate in the sheet mode copying system and for transporting the original without deformation or breakage while being fed at a high rate in the book mode copying system.

9 Claims, 2 Drawing Figures

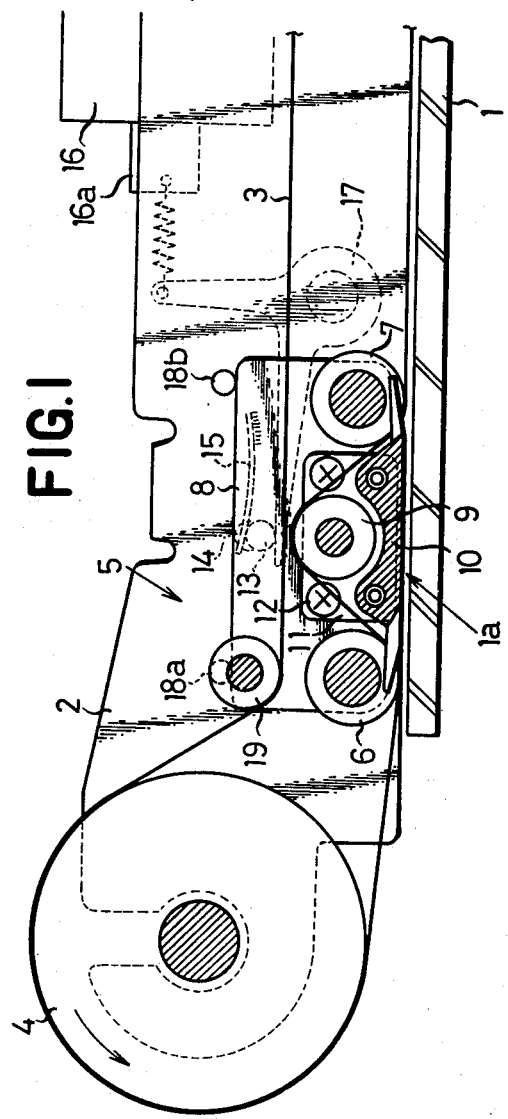

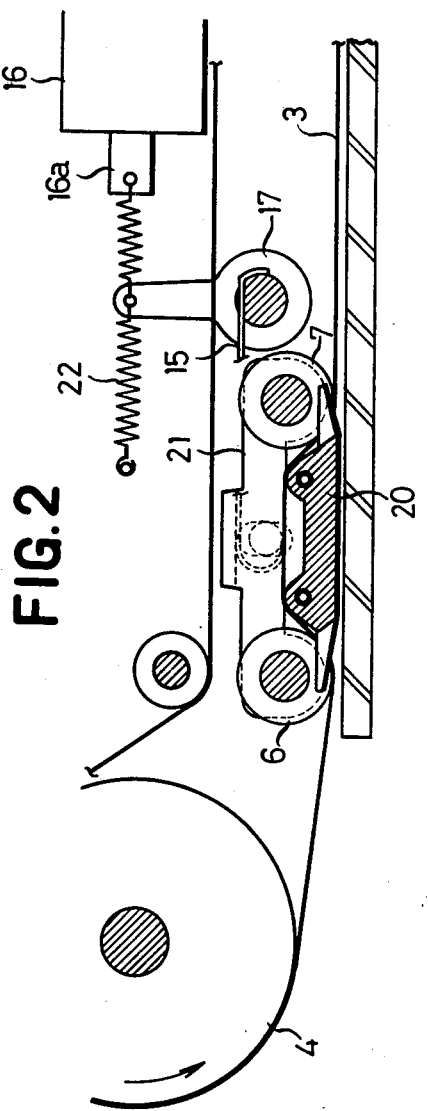

ORIGINAL FEED APPARATUS FOR ELECTROPHOTOGRAPHIC COPYING MACHINE

BACKGROUND OF THE INVENTION

1. Field of the Invention

This invention relates in general to copying devices and in particular to an original feed apparatus for an electrophotographic copying machine for copying an original in accordance with two copying systems including a sheet mode copying system and a book mode copying system.

2. Description of the Prior Art

In the sheet mode copying system, an original in sheet form, being transported by the feed apparatus is irradiated by conventional projection techniques for producing an electrostatic latent image of the subject matter by exposure using a slit. The original in sheet form is transported at a relatively low rate of 200 to 300 mm/sec, the rate varying depending on the magnification at which the copying of the original is effected. The original in sheet form is transported by the feed apparatus when it is illuminated for forming a latent image, so that no slip of the original should occur. On the other hand, in the book mode copying system, an original in sheet form or in the form of a document of large thickness, such as a book, is placed on a glass plate and scanned by an optical system while being irradiated for producing a latent image. When an original in sheet form is irradiated for producing a latent image in accordance with the book mode copying system, the original is transported on the glass plate by the feed apparatus at a relatively high rate of about 1000 mm/sec and stopped in a predetermined position on the glass plate as it abuts against a stopper. The stopper is moved away from the path of travel of the original both when the latter is moved forwardly after completion of irradiation thereof in the book mode copying system and when copying is carried out in accordance with the sheet mode copying system so that the stopper may not interfere with the transportation of the original in sheet form.

In order to avoid deformation or breakage of an original in sheet form when it abuts against a stopper or becomes jammed during its transportation in accordance with the book mode copying system, transportation of the original is customarily effected on the slack side of a conveyor belt by utilizing the loosening thereof. Thus the original can easily slip while being transported.

When the copying of a thin original is carried out in accordance with the sheet mode copying system in such a multi-mode copying machine, there is the tendency of "belt marks" being produced on the reproduction copy because background areas of the original transmits the light to the endless belts of the feed apparatus on which the original is being transported. The production of belt marks lowers the reproduction quality. When a copy sheet is larger in size than the original, it often happens that undesirable shadows of the belts are produced on side and end margins of the copy sheet. Further, in the copying machine of this type an original in sheet form should be fed exactly at a predetermined rate in the sheet mode copying system and prevented from deformation or breakage while being fed at a high rate in the book mode copying system.

SUMMARY OF THE INVENTION

This invention has as its object the provision of an original feed apparatus which obviates the aforementioned disadvantages of original feed apparatus of the prior art of the type described.

Accordingly, it is a object of the invention to provide a feed apparatus for feeding an original in an electrophotographic copying machine which is capable of effecting copying of an original sheet in accordance with a so-called sheet mode copying system as well as a book mode copying system which includes a transparent member having a radiation position over which the sheet is fed by conveyor belt means which includes at least one belt which is engageable with the original sheet for transporting it past the irradiation position and which further includes guide means for guiding the belt over the transparent member and to deflect the belt away from the transparent member along with the sheet at the location of the irradiation position as the sheet is moved in its travel when copying is carried out in a sheet mode and which further includes a member engageable with the originals for guiding the original so that it moves along the original irradiation position over the transparent member, and further including control means engageable with the belt means for permitting the original in sheet form to be fed while the belt guide means presses the original against the transparent member over the irradiation position in the sheet mode operation and permitting the original to be fed while the pressing force which was previously exerted on the belt is released in the book mode of operaton.

A further object of the invention is to provide a feeding device for feeding an original in an electrophotographic copying machine which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1 is a sectional view of the original feed apparatus for an electrophotographic copying machine comprising one embodiment of the invention; and FIG. 2 is a sectional view of another embodment of the invention.

GENERAL DESCRIPTION OF THE PREFERRED EMBODMENTS

The invention will now be described by referring to the embodiments shown in the accompanying drawings. In FIG. 1, the original feed apparatus is arranged on a transparent member such as a glass plate 1 of the copy machine having an irradiation position 1a. The feed apparatus comprises a drive roller 4 for at least one or a plurality of conveyor belts 3 rotatably supported by side plates 2. Belt deflecting means 5 according to the invention, is located on the sheet irradiation position 1a for the sheet mode copying system on the glass plate 1.

The belt deflecting means 5 comprises a medium side plate 8 supporting pressing rollers 6 and 7 and a small side plate 11 supporting belt deflection means in the form of a belt lifting rotatable roller 9 and a guide plate 10. The small side plate 11 is detachably attached to the medium side plate 8 by screws 12, so that the small side plate 11, belt lifting roller 9 and guide plate 10 can be removed as a unit when the belts 3 are replaced by new ones. The underside of the guideplate 10 which faces the upper surface of the glass plate 1 is painted white to reflect the projected light. Front and rear end portions of the guide plate 10 are in the form of a comb and they bite into the pressing rollers 6 and 7 respectively, and the bottom of the forward end of the comb-shaped front portion, biting into the pressing roller 6, is tapered so that an original in sheet form which is transported by the belts 3 may not catch against the guide plate 10.

Attached to the medium side plate 8 is a pin 13 which is received for vertical movement in a slot 14 formed in the side plate 2 which has mounted thereon a plate spring 15 engaging at its forward end the pin 13 to urge the same to move downwardly by its biasing force. As a result, the biasing force of the plate spring 15 is distributed to the two pressing rollers 6 and 7 accordingto the principle of a balancing toy. Mounted on the side plate 2 is a solenoid 16 having a plunger 16a connected through a spring to the end of one arm of control means in the form of a pin lifting lever 17 pivotally supported by the side plate 2. The other arm of the lever 17 has its end disposed below the pin 13 for lifting the pin 13 when the solenoid 16 is energized. 18a and 18b are stoppers against which the medium side plate 8 abuts to become stationary when the pin 13 is lifted. 19 designates a belt tensioning roller rotatably supported by the side plate 2.

When a copying operation is performed in a sheet mode, the two pressing rollers 6 and 7 are brought into pressing engagement with the glass plate 1 by the action of the plate spring 15 to ensure that an original in sheet form is transported exactly at a predetermined rate.

The original in sheet form transported by the belts 3 is guided by the comb-like forward end of the guide plate 10 to travel beneath the guide plate 10 when it reaches the irradiation position 1a. In the irradiation position, the original is exposed to the light projected from a light source, not shown. When this is the case, the belts 3 passes from one pressing roller 6 over the belt lifting roller 9 to the other pressing roller 7. That is, the belts 3 travel along a roundabout way above the guide plate 1. Thus even if the original is small in thickness or transparent in material, the possibilities of production of belt marks due to the light being transmitted to the belts 3 can be eliminated. The guide plate 10 is painted white at the underside thereof and has a sufficiently large area to cover the irradiation position 1a, so that the production of shadows on side and end margins of a copy sheet larger in size than the original can be avoided.

When copying is effected in the book mode, the solenoid 16 is energized to lift the medium side plate 8 through the lever 17 and pin 13. The medium side plate 8 becomes stationary when it abuts against the stoppers 18a and 18b, and the pressing rollers 6 and 7 are moved away from the glass plate 1. At this time, the conveyor belts 3 travel at a high rate and transport an original in sheet form at a high rate until the original abuts at its leading end against a reference stopper and stops on the glass plate 1. Then the optical system is moved in scanning movement while the original is exposed to irradiation, so that an electrostatic latent image will be formed. The transportation of the original at a high rate is effected by utilizing the loosening of the belts 3 to cause the original to slip to some extent. To this end, the run of the conveyor belts 3 facing the glass plate 1 is the slack side of the belts. If the pressing rollers 6 and 7 are in contact with the glass plate 1, the pressing roller 7 acts to transport the original in sheet form even if the latter abuts against the reference stopper, thereby breaking the original. When the original has a large length, the pressing roller 6 may perform the same undesirable action. Thus, the pressing rollers 6 and 7 had better be moved away from the glass plate 1. When the original has a large thickness, the original feed apparatus is pivoted away from the copying station or removed from the copying machine by a conventional system, and the original is plated on the glass plate for producing its copy.

In the embodiment shown in FIG. 2 a guide plate 20 is directly supported by a medium side plate 21 and the belts 3 travel past the back of the guide plate 20. The plate spring 15 is mounted on a shaft 32 which supports the lever 17 for pivotal movement for performing a pin lifting action. 22 designates a spring for restoring the lever 17 to its original position. This embodiment is similar to the embodiment shown in FIG. 1 in other respects.

From the foregoing description, it will be appreciated that this invention makes it possible to eliminate belt marks and undesirable shadows in side and end margins on a copy sheet, thereby increasing the reproduction quality of an original of small thickness or transparent material in effecting copying in a sheet mode, and ensures a stable transportation of originals in sheet form in the sheet mode copying system and in the book mode copying system.

What is claimed is:

1. A device for feeding an original past an irradiation position over a transparent member of an electrophotographic copying machine which is capable of operating with a sheet mode copying operation and with a book mode copying operation, comprising an endless belt conveyor having a reach movable over the transparent member, deflection means at the location of the irradiation position effective to move said belt away from said transparent member at the irradiation position and return it to said member at the end of the irradiation position, a guide plate overlying the transparent member at the irradiation position and engageable with the original at the irradiation position, and control means engageable with said belt and said guide plate and being movable to a sheet mode operation position in which said belt is pressed against the original at the irradiation position and being also movable to a book mode operation position in which said belt is not pressed against the original at the irradiation position.

2. A device for feeding an original past an irradiation position according to claim 1 wherein said deflection means includes a belt guide roller over which said belt travels located at each end of the irradiation position and overlying the transparent member and a belt lifting roller located between said guide rollers spaced away from the transparent member, said belt being guided over said lifting roller being moved away from the transparent member by said belt lifting roller between said guide rollers.

3. A device according to claim 2 including a first plate carrying said guide rollers, means mounting said first plate for upward and downward movement relative to the transparent member.

4. A device according to claim 3 including a second plate connected to said first plate and being movable therewith and being located between said guide rollers, said second plate carrying said guide plate and said belt lifting roller, said control means comprising a lever engageable with said first plate in lowering said first plate.

5. A device according to claim 4 wherein said means mounting said first plate includes first and second stopper members engageable with the top of said plate, said plate being centered by said stopping members so as to position said deflecting rollers to engage the original on each side of the irradiation belt.

6. A device according to claim 5 wherein said control means includes a solenoid connected to said lever to shift said lever between two operating positions.

7. A device according to claim 4 including spring means biasing said first plate in a downward direction said control means including a lever member engaged with said plate and urging it against said spring member and actuating means connected to said lever member to move it against said biasing means to lift said plate.

8. A device according to claim 7 wherein said actuating means includes a solenoid connected to said lever, said spring means urging said lever into a neutral position.

9. A device according to claim 1 wherein said guide plate has an end portion at each end comprising a comb, a pressing roller engaged with said belt at each end of the irradiation position and having at least a portion disposed between the teeth of said comb portions of said plate.

* * * * *